United States Patent
Veillette

(10) Patent No.: US 11,553,507 B2
(45) Date of Patent: Jan. 10, 2023

(54) METHOD AND SYSTEM FOR MULTI-CHANNEL BEACONING IN A TIME SLOTTED CHANNEL HOPPING NETWORK

(71) Applicant: Trilliant Networks, Inc., Cary, NC (US)

(72) Inventor: Michel Veillette, Waterloo (CA)

(73) Assignee: Trilliant Networks, Inc., Cary, NC (US)

( * ) Notice: Subject to any disclaimer, the term of this patent is extended or adjusted under 35 U.S.C. 154(b) by 10 days.

(21) Appl. No.: 17/140,648

(22) Filed: Jan. 4, 2021

(65) Prior Publication Data

US 2021/0235468 A1 Jul. 29, 2021

Related U.S. Application Data

(60) Provisional application No. 62/966,058, filed on Jan. 27, 2020.

(51) Int. Cl.
| | |
|---|---|
| *H04W 72/12* | (2009.01) |
| *H04W 28/02* | (2009.01) |
| *H04W 72/00* | (2009.01) |
| *H04W 48/10* | (2009.01) |

(52) U.S. Cl.
CPC ... *H04W 72/1231* (2013.01); *H04W 28/0236* (2013.01); *H04W 48/10* (2013.01); *H04W 72/005* (2013.01)

(58) Field of Classification Search
CPC ....... H04W 72/12331; H04W 28/0236; H04W 72/005; H04W 48/10
See application file for complete search history.

(56) References Cited

U.S. PATENT DOCUMENTS

| | | | | |
|---|---|---|---|---|
| 7,564,812 B1* | 7/2009 | Elliott | ................... | H04W 48/08 455/450 |
| 8,724,557 B2* | 5/2014 | Shin | .................. | H04W 72/1257 370/329 |
| 2006/0239220 A1* | 10/2006 | Celentano | ............. | H04W 48/08 370/328 |

(Continued)

FOREIGN PATENT DOCUMENTS

KR 20100053428 A * 5/2010

OTHER PUBLICATIONS

Lu Wang et al., A Simulative Study of Network Association Delays in IEEE 802.15.4e TSCH Networks, in: 2017 IEEE 18th International Symposium on A World of Wireless, Mobile and Multimedia Networks (WoWMoM), Jul. 13, 2017, E-ISSBN: 978-1-5386-2723-5, abstract; sections 1-4; and figure 1.

(Continued)

*Primary Examiner* — Parth Patel
(74) *Attorney, Agent, or Firm* — Moser Taboada

(57) ABSTRACT

A method for multi-channel beaconing in a network comprising for each network node of a plurality of network nodes: determining a link or a pseudo random sequence of links that identifies when and on what channel the network node is scheduled to transmit beacons; receiving the schedule for when and on which channel the network node should listen for beacons from one or more neighbor nodes of the plurality of network nodes; transmitting beacons based the established schedule; and listening for beacons from one or more neighbor nodes based on the schedule received from these neighbor nodes.

20 Claims, 4 Drawing Sheets

(56) References Cited

U.S. PATENT DOCUMENTS

| | | | |
|---|---|---|---|
| 2006/0280200 A1* | 12/2006 | Lane | H04W 56/0045 370/458 |
| 2009/0207865 A1* | 8/2009 | Yonge, III | H04J 3/0655 370/503 |
| 2009/0316621 A1* | 12/2009 | Lane | H04L 5/0051 370/336 |
| 2010/0034159 A1* | 2/2010 | Shin | H04W 72/04 370/329 |
| 2010/0111006 A1* | 5/2010 | Zhai | H04W 99/00 370/329 |
| 2010/0304772 A1* | 12/2010 | Wang | H04W 56/003 455/509 |
| 2011/0158083 A1* | 6/2011 | Bakshi | H04L 45/04 370/252 |
| 2011/0216658 A1* | 9/2011 | Etkin | H04L 43/00 370/242 |
| 2012/0127865 A1* | 5/2012 | Nakae | H04W 72/082 370/337 |
| 2013/0094481 A1* | 4/2013 | Jeong | H04L 23/02 370/336 |
| 2013/0235813 A1* | 9/2013 | Segev | H04W 72/042 370/329 |
| 2017/0041927 A1* | 2/2017 | Jeong | H04W 74/0816 |
| 2018/0292538 A1* | 10/2018 | Raghupathy | G01S 19/11 |
| 2021/0235468 A1* | 7/2021 | Veillette | H04W 48/10 |

OTHER PUBLICATIONS

Sukho Oh et al., Escalator: An Autonomous Scheduling Scheme for Convergecast in TSCH, Apr. 16, 2018, [retrieved on Apr. 5, 2021], Retrieved from the internet: <URL: https://www.ncbi.nlm.nih.gov/pmc/articles/PMC5948937/> pp. 3, 8, 16.

International Search Report and Written Opinion, International application No. PCT/US2021/012036, dated Apr. 27, 2021.

* cited by examiner

//* METHOD AND SYSTEM FOR MULTI-CHANNEL BEACONING IN A TIME SLOTTED CHANNEL HOPPING NETWORK

CROSS-REFERENCE TO RELATED APPLICATIONS

This application claims priority to U.S. Provisional Patent Application Ser. No. 62/966,058 filed Jan. 27, 2020, which is incorporated by reference herein in its entirety.

BACKGROUND

Field

Embodiments of the present invention generally relate to beacon transmission and more specifically, to a method and system for multi-channel beaconing in a Time Slotted Channel Hopping (TSCH) network.

Description of the Related Art

Networks, such as mesh radio networks, consist of nodes (i.e., devices) that connect directly, dynamically, and non-hierarchically to other nodes and cooperate with one another to efficiently route data through the network. Nodes implementing the TSCH Medium Access Control (MAC) layer are periodically switching channels (i.e., hopping). Nodes in a TSCH network typically broadcast a special message called a beacon. These periodic beacons are used during the joining process to the network and may be used in steady state to implement auxiliary functions. For example, beacons may be used to guarantee a minimum level of traffic in order to maintain the synchronization between nodes within a TSCH network. In addition, a lack of incoming beacons from a neighbor node may be used to detect the loss of that neighbor node.

The TSCH protocol defines repeating slotframes which are composed of several timeslots. Nodes are configured to use timeslots within a slotframe for transmitting and/or receiving messages. TSCH networks define a channel hopping sequence and then assign each node a channel offset for each configured timeslot. The channel offset is a value added to the current index within the hopping sequence to determine the channel that is to be used. Nodes that need to communicate with each other will use the same timeslot and channel offset. Nodes communicating with each other can use the same timeslot by using different channel offsets. Typically, beacons are broadcast on a default channel offset. In order to avoid collision between beacons transmitted by different nodes, each node is assigned or randomly selects a unique timeslot within each area or within the entire network. A beaconing period is therefore a function of the percentage of bandwidth allocated to these beacons and the number of nodes supported per area or per network.

The resulting beaconing period of a large TSCH network that respects these constraints is significantly long. For example, the shortest unique beaconing period of a network comprising five thousand (5000) nodes, configured with a 20 milliseconds timeslot, with ten percent (10%) of the bandwidth allocated to beaconing is 16.7 minutes.

Therefore, there is a need for a method and system to reduce the period between consecutive beacons by enabling multiple nodes to simultaneously transmit beacons on different channel offsets.

SUMMARY

A system and method are provided for multi-channel beaconing in a network substantially as shown in and described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
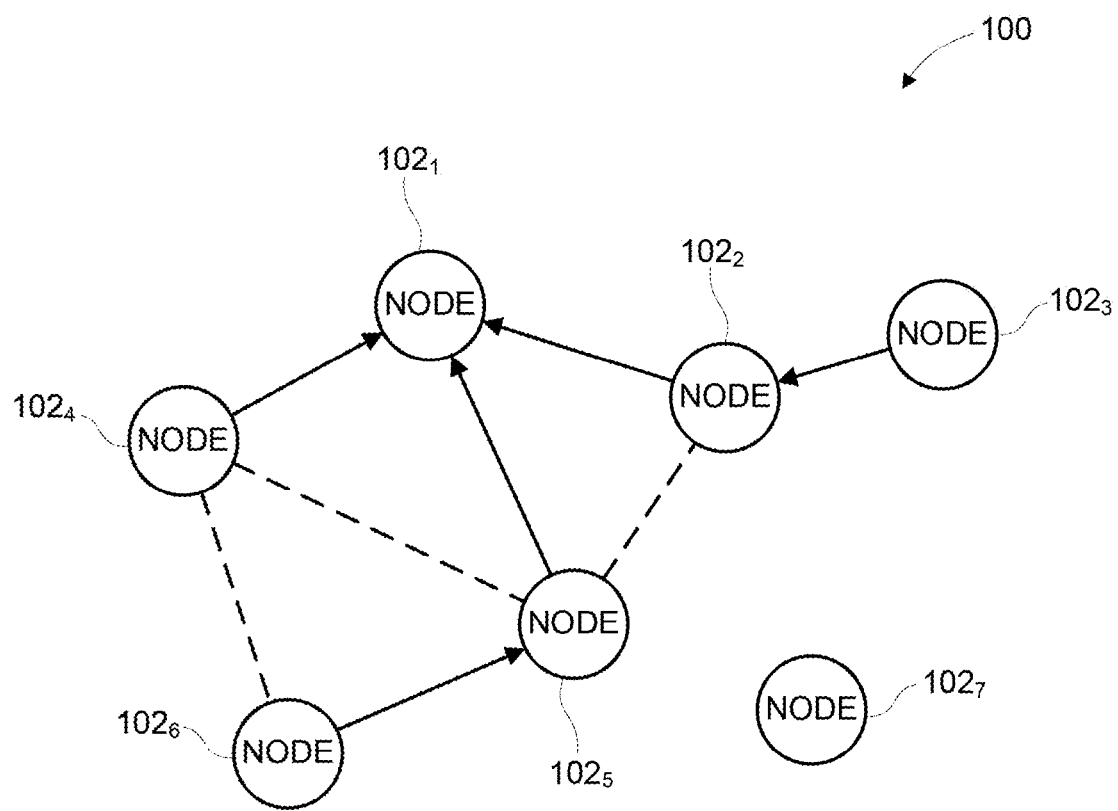
FIG. 1 depicts a diagram of an exemplary mesh network implementing multi-channel beaconing in a network, according to one or more embodiments of the invention.

While the method and system are described herein by way of example for several embodiments and illustrative drawings, those skilled in the art will recognize that the method and system for multi-channel beaconing in a network is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and system for multi-channel beaconing in a network defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to. Although the word "node" is used herein, those skilled in the art will appreciate that the disclosed invention may be implemented on any network device.

DETAILED DESCRIPTION OF EMBODIMENTS

Embodiments of the invention provide a system and method for multi-channel beaconing in a network, according to one or more embodiments. The present method for multi-channel beaconing comprises distributing beacons in both the time and frequency domain. Each node broadcasts beacons using a TSCH link comprising a timeslot in a slotframe and a channel offset. In some embodiments, the minimum period between subsequent beacon broadcasts is divided by the number of channels available. For example, in the previous example that uses one channel defined by the default channel offset, a beacon was sent from each node at a maximum rate of one every sixteen minutes. If we assume a hopping sequence with sixty (60) channels, the minimum period of the multi-channel beacon decreases to 16.7 minutes/60, or 16.7 seconds.

Advantageously, the present invention improves the scalability of various functions within a network. In the context of the time synchronization function, the multi-channel beacons allow the transmission of more frequent synchronization messages, which enable more efficient timeslot, thereby increasing the effective data bandwidth available. In the context of the unreachability detection function, the multi-channel beacons enable a faster detection of the loss of an important neighbor (e.g. time source, routing parent). The present disclosure improves the reliability of the communications within the TSCH network and reduces communication down time. This also reduces the time required to fail over a critical network resource such as an access point to a different access point in the case of a catastrophic failure of the primary access point. In the context of the link characterization function, the multi-channel beacons allow a faster characterization of the neighbor routers, which enable a faster reorganization of the routing topology in the case of a sudden change in the reliability of a link. In the context of the passive discovery function, the multi-channel beacons enable the transmission of more frequent beacons which reduce the time required by an unsynchronized node to receive one of these beacons.

This method shares some similarities with the concept of "Autonomous Cells" defined by the 6TiSCH Minimal Scheduling Function (I-D. ietf-6tisch-msf). However, these two methods address different use cases and have different constraints. Autonomous Cells are used to transmit ad-hoc unicast data frame, the multi-channel beacon method is used to schedule periodic beacon broadcast. Autonomous Cells can tolerate conflicting TSCH links, the multi-channel beacon method avoids conflicting links.

Various embodiments of a system and method for multi-channel beaconing in a network are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on digital signals stored within a memory of a specific apparatus or special purpose computing device or platform. In the context of this specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device can manipulate or transforming signals, typically represented as physical electronic or magnetic quantities within memories, registers, or other information storage devices, transmission devices, or display devices of the special purpose computer or similar special purpose electronic computing device.

FIG. 1 is a graphical depiction of an exemplary mesh network 100 comprising network nodes 1021, 1022, 1023, 1024, 1025, 1026 (collectively referred to as network nodes 102) and a node 1027 that is not yet synchronized with the network, according to one or more embodiments of the invention. The network nodes 102 are interconnected to each other such that each network node 102 has a node that is used as a time source for the network node 102. Arrows point to the time source of each network node 102 with nodes receiving beacons is the opposite direction. The dashed lines represent alternate communication links between nodes. Within a TSCH network, each network node 102 maintains the synchronization with the network by monitoring the transmission of the beacon from its time source node(s) 102. Network node 1026 monitors the beacon transmission from network node 1025. Network node 1023 monitors the beacon transmission from network node 1022. Network node 1024 monitors the beacon transmission from network node 1021, as do network node 1022 and network node 1025. These beacons are received only by neighboring nodes that are aware of their schedule (i.e., the timeslot neighboring node is beaconing on and the channel offset it is using). The multi-channel beaconing described in the present disclosure is complementary to beacons transmitted on the default channel offset in order to improve the efficiency of some functions based on these beacons. An exemplary network that may utilize and benefit from the present invention is a radio mesh network. Those skilled in the art can realize from the following disclosure that other network topologies, both wired and wireless, will find benefit by using the present invention.

Figure 2:
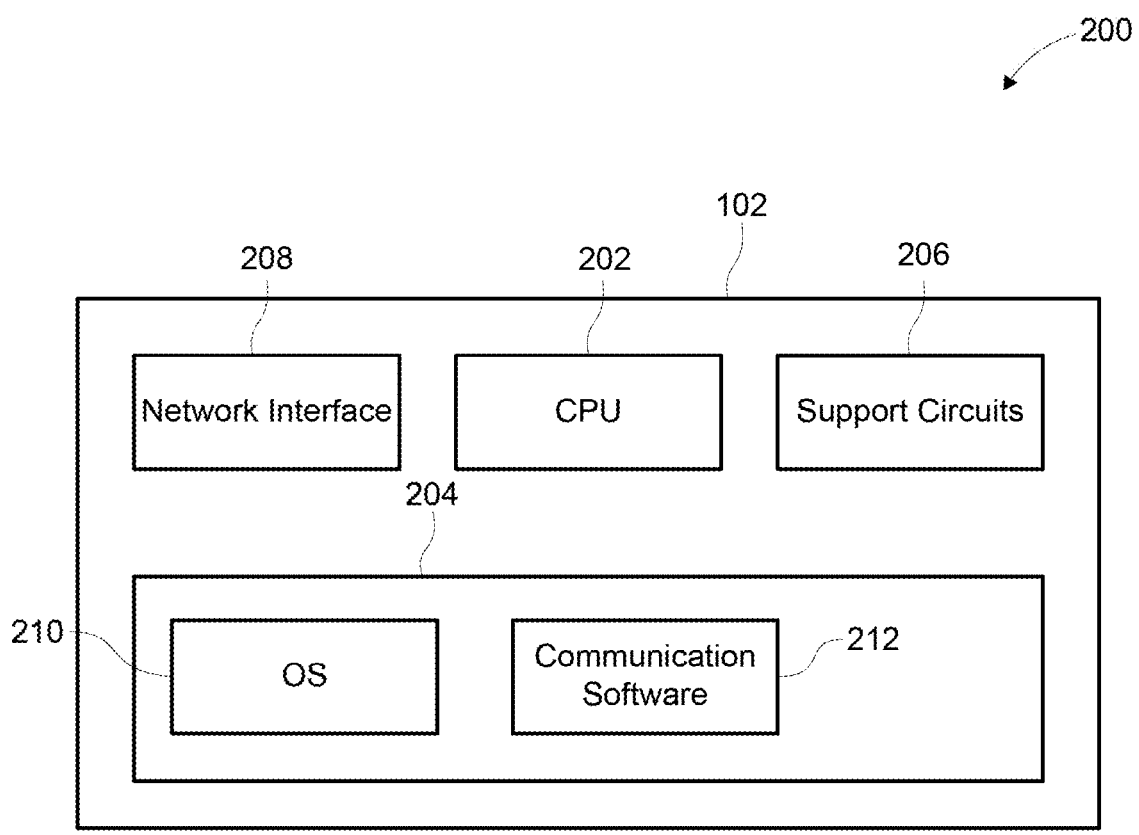
FIG. 2 depicts a block diagram of an exemplary network node for use within a routed network implementing multi-channel beaconing in a network, according to one or more embodiments of the invention.

FIG. 2 is a block diagram 200 of a node 102. The node 102 may be a one or more individual Internet of Things (IoT) devices, such as meters, sensors, routers, access points, streetlights, and the like that may benefit from connection to a computer or communications network.

The node 102 comprises a CPU 202, support circuits 206, memory 204 and a network interface 208. The CPU 202 may comprise one or more readily available microprocessors or microcontrollers. The support circuits 206 are well known circuits that are used to support the operation of the CPU and may comprise one or more of power supplies, input/output circuits, clock circuits, and the like. Memory 204 may comprise random access memory, read only memory, removable disk memory, flash memory, optical memory or various combinations of these types of memory. The memory 204 is sometimes referred to as main memory and may, in part, be used as cache memory or buffer memory. The memory 204 stores various forms of software and files, such as, an operating system (OS) 210, communication software 212 which would in part implement this invention. The operating system 210 may be one of several well-known operating systems or real time operating systems such as FreeRTOS, Contiki, LINUX, WINDOWS, and the like.

The network interface 208 connects the node 102 to the network 100. The network interface 208 may facilitate a wired or wireless connection to other nodes. In some embodiments, for example when node 102 is a border router or access point, node 102 may have multiple interfaces 208 for routing within the network 100 as well as to connect to another network.

Figure 3:
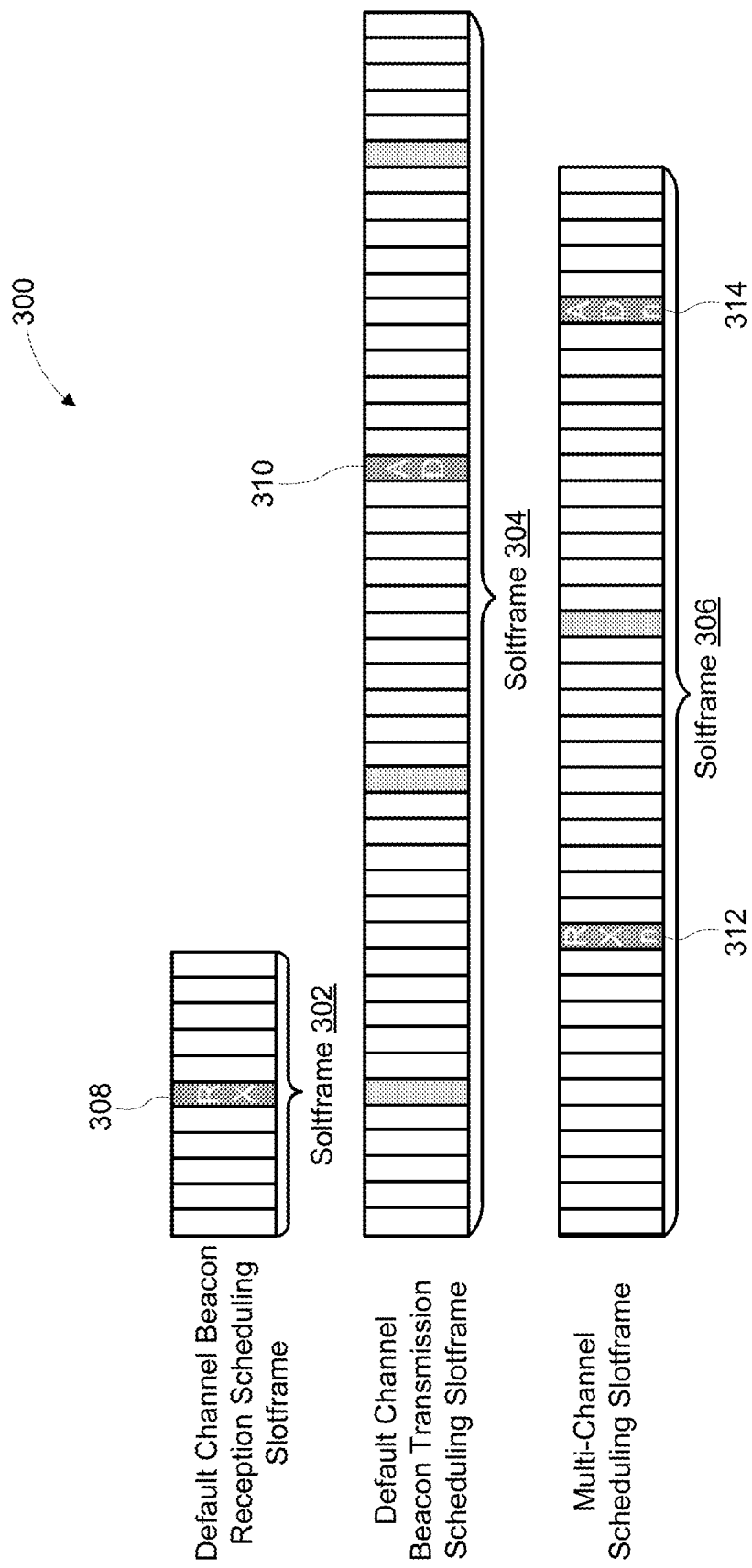
FIG. 3 depicts an example of TSCH scheduling slotframes using the default channel offset and the multi-channel beaconing of the present disclosure, according to one or more embodiments of the invention.

FIG. 3 depicts an example 300 of TSCH scheduling slotframes using the default channel offset and the multi-channel beaconing method of the present disclosure. The scheduling slotframes include a default channel offset beacon reception scheduling slotframe 302, a default channel offset beacon transmission scheduling slotframe 304, and multi-channel scheduling slotframe 306. A TSCH schedule instructs each node what to do in each timeslot, specifically, when to transmit a beacon and when to receive a beacon. Each slotframe has a finite length and is constantly repeated.

The default channel beacon reception scheduling slotframe 302 is used to configure when to listen for beacons on the default channel offset. In the present example, the receive timeslot on the default channel (RX) is timeslot 308. The default channel beacon transmission scheduling slotframe 304 is used to configure when a specific network node transmits its beacons. In the present example, the beacon advertising timeslot on the default channel (AD) in timeslot 310. The number of timeslots in the default channel beacon reception scheduling slotframe 304 defines the period between each default channel offset beacon and must be a multiple of the default channel beacon reception scheduling slotframe 302.

The multi-channel scheduling slotframe 306 is used to configure on which timeslot a specific node is transmitting its multi-channel beacon and on which channel offset. The multi-channel scheduling slotframe 306 is also used to schedule on which timeslot and on which channel offset the network node listens for multi-channel beacons from specific neighbor nodes. The length of the multi-channel scheduling slotframe 306 must be a multiple of the default channel beacon reception scheduling slotframe 302. The timeslots used to transmit, and listen should not conflict with the receive timeslot 308 of the default channel beacon reception scheduling slotframe 302. In the present example, the receive timeslot on channel offset n (RXn) of slotframe 306 of a specific node 1025 in FIG. 1 is timeslot 312 and the beacon advertising timeslot on channel offset n (ADn) of slotframe 306 is timeslot 314. This means node 1021 transmits its beacons on timeslot 312 and node 1026 receives beacons from node 1025 on timeslot 314.

The method for configuring the links used for the multi-channel beacons may be centralized or distributed.

Figure 4:
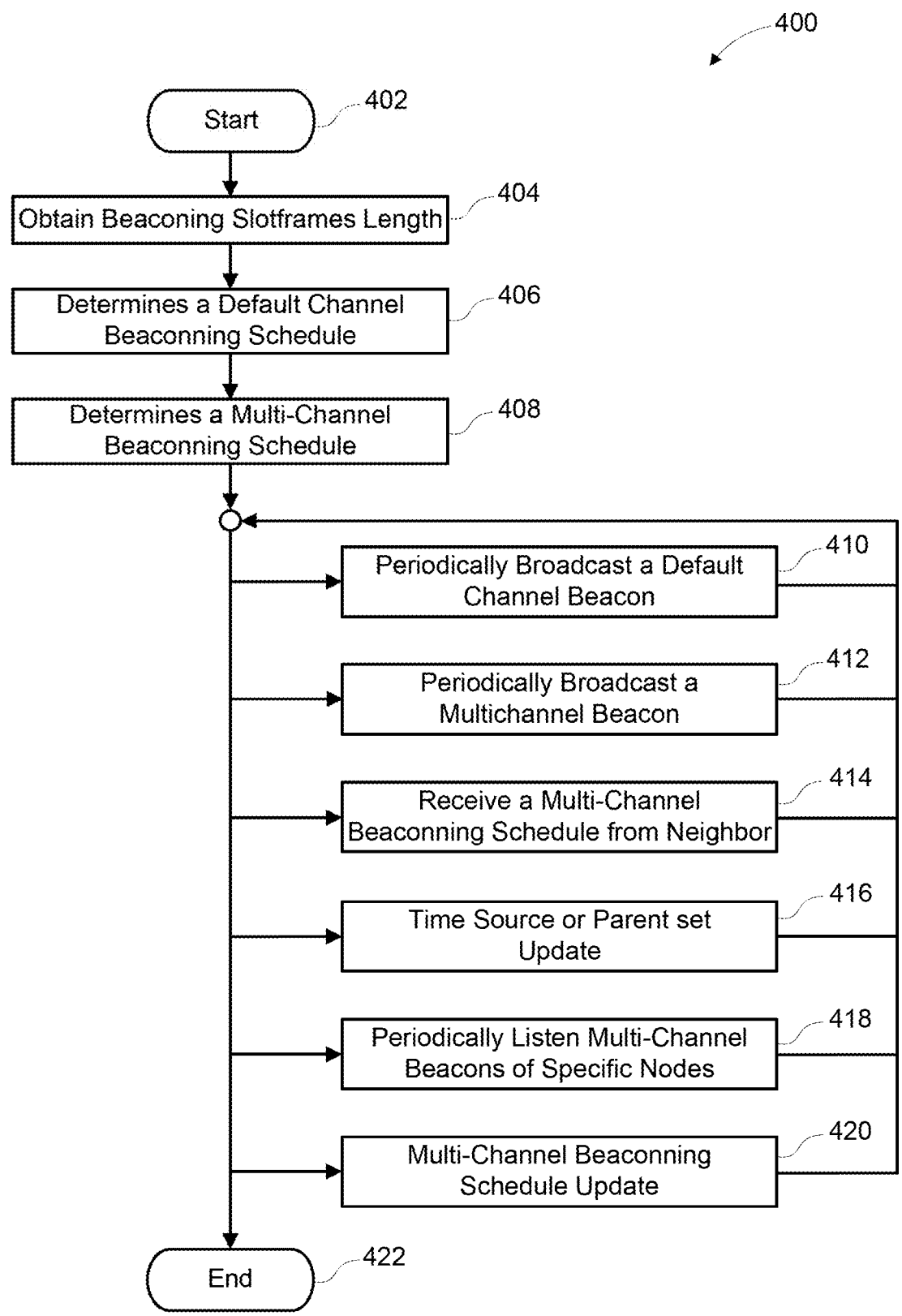
FIG. 4 depicts a flow diagram for a method of multi-channel beaconing node in a network, according to one or more embodiments of the invention.

FIG. 4 depicts a flow diagram of a method 400 for multi-channel beaconing in a network, according to one or more embodiments of the invention. The method 400 is performed by each node in a network. The method 400 starts at step 402 when the node joins the network and proceeds to step 404.

At step 404, the node obtains the length of its different beaconing slotframes; the default channel beacon reception scheduling slotframe, the default channel beacon transmission scheduling slotframe, and the multi-channel scheduling slotframe.

At step 406, the node determines its default channel beacons schedule. This schedule may be a link, a pseudo random sequence of links, or a seed of a pseudo random function used to derive this sequence. The schedule identifies when the network node is scheduled to broadcast its default channel beacons.

At step 408, the node determines its multi-channel beacons schedule. This schedule can be a link, a pseudo random sequence of links, or a seed of a pseudo random function used to derive this sequence. The schedule identifies when and on which channel offset the network node is scheduled to broadcast its multi-channel beacons.

Steps 410, 412, 414, 416 and 418 are performed concurrently by the node while joined to the network. The process end at step 422 when the node desynchronizes or when the node deliberates leaves the network.

At step 410, the node periodically broadcasts a default channel beacon at the timeslot specified by the schedule established at step 406. These default channel beacons contain the schedule of the multi-channel beacons.

At step 412, the node periodically broadcasts a multi-channel beacon at the timeslot and channel offset specified by the schedule established at step 408 or updated by step 420.

At step 414, the node receives for a neighbor node the schedule that identifies when and on which channel the network node should listen for its multi-channel beacons.

At step 416, the node chooses or update its time source or routing parent set.

At step 418, the node periodically listens for a multi-channel beacon based on the information obtained at steps 414 and 416.

At step 420, the node updates its multi-channel beacon schedule to avoid a timeslot conflict between its schedule and the schedule of a monitored node (e.g. time source, parent). The new schedule should be advertised prior to its use to allow for a non-disturbing transition. This step is required only with the schedule consist of a fix link. Pseudo random sequence of links are conflicting only momentarily and do not need to be updated.

When a listening node determines that a broadcasting node is not longer broadcasting on an assigned link, the listening node sends test messages to the broadcasting node. When no response is received, the listening node reports a loss of connectivity, reroutes traffic around the broadcasting node, and removes the broadcasting node from a list of neighboring nodes.

The method 400 ends at step 422.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

The invention claimed is:

1. A method for multi-channel beaconing in a network, comprising:
    determining a link or a pseudo random sequence of links that identifies a default channel beacon broadcast schedule for when a network node of a plurality of network nodes is scheduled to broadcast a default channel beacon of the network node on a default channel of the network node;
    determining a link or a pseudo random sequence of links that identifies a multi-channel beacon broadcast schedule for when and on which different channel offsets the network node is scheduled to broadcast multi-channel beacons of the network node;
    periodically broadcasting a default channel beacon of the network node in accordance with the default channel beacon broadcast schedule, the default channel beacon containing the multi-channel beacon broadcast schedule;
    receiving from one or more neighbor nodes of the plurality of network nodes, a schedule of multi-channel beacons of the one or more neighbor nodes that identifies when and on which channel the network node is to listen for the multi-channel beacons from the one or more neighbor nodes; and
    listening for the multi-channel beacons from the one or more neighbor nodes based on the received schedule of the multi-channel beacons of the one or more neighbor nodes.

2. The method of claim 1, wherein each network node of a plurality of network nodes in a network is configured with a default channel beacon reception scheduling slotframe and link, a default channel beacon transmission scheduling slotframe, and a multi-channel scheduling slotframe.

3. The method of claim 1, wherein the multi-channel beacon broadcast schedule is assigned by a central authority.

4. The method of claim 1, wherein the multi-channel beacon broadcast schedule is generated randomly by each network node of a plurality of network nodes in a network.

5. The method of claim 1, wherein a transition to a different schedule is required after a detection of a conflict between the multi-channel beacon broadcast schedule and the schedule of the multi-channel beacons of the one or more neighbor nodes.

6. The method of claim 1, further comprising determining, by the network node, that the one or more neighbor nodes that is broadcasting is no longer broadcasting on the identified channel.

7. The method of claim 6, further comprises:
    determining, by the network node, a presence of the one or more neighbor nodes that is broadcasting through test messages;
    reporting a loss of connectivity;
    rerouting traffic around the one or more neighbor nodes that is broadcasting; and
    removing the one or more neighbor nodes that is broadcasting from a list of neighboring nodes.

8. A system for multi-channel beaconing in a network, comprising:
    a plurality of network nodes, comprising:
        a) at least one processor;
        b) at least one input device; and
        c) at least one storage device storing processor-executable instructions which, when executed by the at least one processor, perform a method including:
            determining a link or a pseudo random sequence of links that identifies a default channel beacon broadcast schedule for when a network node of a plurality of network nodes is scheduled to broadcast a default channel beacon of the network node on a default channel of the network node;
            determining a link or a pseudo random sequence of links that identifies a multi-channel beacon broadcast schedule for when and on which different channel offsets the network node is scheduled to broadcast multi-channel beacons of the network node;
            periodically broadcasting a default channel beacon of the network node in accordance with the default channel beacon broadcast schedule, the default channel beacon containing the multi-channel beacon broadcast schedule;
            receiving from one or more neighbor nodes of the plurality of network nodes, a schedule of multi-channel beacons, of the one or more neighbor nodes that identifies when and on which channel the network node is to listen for the multi-channel beacons from the one or more neighbor nodes; and
            listening for the multi-channel beacons from the one or more neighbor nodes based on the received schedule of the multi-channel beacons of the one or more neighbor nodes.

9. The system of claim 8, wherein each network node of the plurality of network nodes is configured with a default channel beacon reception scheduling slotframe and link, a default channel beacon transmission scheduling slotframe, and a multi-channel scheduling slotframe.

10. The system of claim 8, wherein the multi-channel beacon broadcast schedule is assigned by a central authority.

11. The system of claim 8, wherein the multi-channel beacon broadcast schedule is generated randomly by each network node of a plurality of network nodes in a network.

12. The system of claim 8, wherein a transition to a different schedule is required after a detection of a conflict between the multi-channel beacon broadcast schedule and the schedule of the multi-channel beacons of the one or more neighbor nodes.

13. The system of claim 8, further comprising determining, by the network node, that the one or more neighbor nodes that is broadcasting is no longer broadcasting on the identified channel.

14. The system of claim 13, further comprises:
    determining, by the network node, a presence of the one or more neighbor nodes that is broadcasting through test messages;
    reporting a loss of connectivity;
    rerouting traffic around the one or more neighbor nodes that is broadcasting; and
    removing the one or more neighbor nodes that is broadcasting from a list of neighboring nodes.

15. A non-transitory computer readable medium for storing computer instructions that, when executed by at least one processor causes the at least one processor to perform a method for multi-channel beaconing in a network, comprising:

determining a link or a pseudo random sequence of links that identifies a default channel beacon broadcast schedule for when a network node of a plurality of network nodes is scheduled to broadcast a default channel beacon of the network node on a default channel of the network node;

determining a link or a pseudo random sequence of links that identifies a multi-channel beacon broadcast schedule for when and on which different channel offsets the network node is scheduled to broadcast multi-channel beacons of the network node;

periodically broadcasting a default channel beacon of the network node in accordance with the default channel beacon broadcast schedule, the default channel beacon containing the multi-channel beacon broadcast schedule;

receiving from one or more neighbor nodes of the plurality of network nodes, a schedule of multi-channel beacons of the one or more neighbor nodes that identifies when and on which channel the network node is to listen for the multi-channel beacons from the one or more neighbor nodes; and listening for the multi-channel beacons from the one or more neighbor nodes based on the received schedule of the multi-channel beacons of the one or more neighbor nodes.

16. The non-transitory computer readable medium of claim 15, wherein each network node of the plurality of network nodes is configured with a default channel beacon reception scheduling slotframe and link, a default channel beacon transmission scheduling slotframe, and a multi-channel scheduling slotframe.

17. The non-transitory computer readable medium of claim 15, wherein the multi-channel beacon broadcast schedule is assigned by a central authority.

18. The non-transitory computer readable medium of claim 15, wherein the multi-channel broadcast beacon schedule is generated randomly by each network node of a plurality of network nodes in a network.

19. The non-transitory computer readable medium of claim 15, wherein a transition to a different schedule is required after a detection of a conflict between the multi-channel beacon broadcast schedule and the schedule of the multi-channel beacons of the one or more neighbor nodes.

20. The non-transitory computer readable medium of claim 15, further comprising:

determining, by the network node, that the one or more neighbor nodes that is broadcasting is no longer broadcasting on the identified channel, wherein determining comprises:

determining, by the network node, a presence of the one or more neighbor nodes that is broadcasting through test messages;

reporting a loss of connectivity;

rerouting traffic around the one or more neighbor nodes that is broadcasting; and removing the one or more neighbor nodes that is broadcasting from a list of neighboring nodes.

* * * * *